United States Patent
MacKay et al.

(10) Patent No.: US 12,277,552 B2
(45) Date of Patent: Apr. 15, 2025

(54) METHODS AND DEVICES FOR PROPAGATING BLOCKS IN A BLOCKCHAIN NETWORK

(71) Applicant: nChain Licensing AG, Zug (CH)

(72) Inventors: Alex MacKay, London (GB); Wei Zhang, London (GB); Craig Wright, London (GB); Steven Patrick Coughlan, London (GB)

(73) Assignee: nChain Licensing AG, Zug (CH)

( * ) Notice: Subject to any disclaimer, the term of this patent is extended or adjusted under 35 U.S.C. 154(b) by 588 days.

(21) Appl. No.: 17/602,168

(22) PCT Filed: Apr. 9, 2020

(86) PCT No.: PCT/IB2020/053416
§ 371 (c)(1),
(2) Date: Oct. 7, 2021

(87) PCT Pub. No.: WO2020/208580
PCT Pub. Date: Oct. 15, 2020

(65) Prior Publication Data
US 2022/0156735 A1 May 19, 2022

(30) Foreign Application Priority Data
Apr. 12, 2019 (GB) .................. 1905221

(51) Int. Cl.
*H04L 9/00* (2022.01)
*G06Q 20/06* (2012.01)
(Continued)

(52) U.S. Cl.
CPC ....... *G06Q 20/3827* (2013.01); *G06Q 20/065* (2013.01); *G06Q 20/223* (2013.01);
(Continued)

(58) Field of Classification Search
CPC ....... H04L 9/50; H04L 9/3239; G06Q 20/223; G06Q 20/3825
See application file for complete search history.

(56) References Cited

U.S. PATENT DOCUMENTS 8,706,701 B1 4/2014 Stefanov et al.
10,250,708 B1 4/2019 Carver et al.
(Continued)

FOREIGN PATENT DOCUMENTS

WO 2018224955 A1 12/2018
WO 2018229633 A1 12/2018
(Continued)

OTHER PUBLICATIONS

Decker et al., Information propagation in the Bitcoin network, Sep. 1, 2013, IEEE P2P 2013 Proceedings (pp. 1-10) (Year: 2013).*
(Continued)

*Primary Examiner* — Khang Do
(74) *Attorney, Agent, or Firm* — Messner Reeves LLP (57) ABSTRACT

Methods and devices for propagating blocks in a blockchain network. At a mining node, while hashing a first block header of a first candidate block, the mining node sends, to other mining nodes, a first message specifying transactions and their order in a first ordered set of transactions contained in the first candidate block. The mining also receives a second message specifying transactions and their order in a second ordered set of transactions contained in a second candidate block being mined by a second mining node. If the mining node succeeds in mining the candidate block it notifies other mining nodes by providing them with a coinbase transaction, hash value, and timestamp. If another mining node is successful, then the mining node receives information from the other mining node from which, in
(Continued)

conjunction with the second message, it can assemble the second candidate block and validate it.

23 Claims, 8 Drawing Sheets

(51) Int. Cl.
*G06Q 20/22* (2012.01)
*G06Q 20/38* (2012.01)
*H04L 9/32* (2006.01)

(52) U.S. Cl.
CPC ....... *G06Q 20/3825* (2013.01); *H04L 9/3239* (2013.01); *H04L 9/3247* (2013.01); *H04L 9/3265* (2013.01); *H04L 9/50* (2022.05); *H04L 2209/56* (2013.01)

(56) References Cited

U.S. PATENT DOCUMENTS

| | | | |
|---|---|---|---|
| 10,372,943 B1* | 8/2019 | Rodriguez De Castro | G06F 21/72 |
| 10,742,421 B1 | 8/2020 | Wentz et al. | |
| 11,038,685 B1* | 6/2021 | Dennis | H04L 9/3239 |
| 11,487,886 B2* | 11/2022 | Koorella | H04L 9/0838 |
| 2008/0195583 A1 | 8/2008 | Hsu et al. | |
| 2010/0217798 A1* | 8/2010 | Asami | A63F 13/30 709/225 |
| 2012/0030468 A1 | 2/2012 | Papamanthou et al. | |
| 2012/0222130 A1* | 8/2012 | Lee | H04L 9/3236 726/27 |
| 2015/0317748 A1* | 11/2015 | Roberts | G06Q 20/34 705/30 |
| 2017/0178072 A1* | 6/2017 | Poornachandran | H04L 9/3236 |
| 2017/0243176 A1* | 8/2017 | Hanke | G06Q 20/0655 |
| 2017/0316497 A1 | 11/2017 | Song et al. | |
| 2017/0344435 A1 | 11/2017 | Davis | |
| 2017/0344987 A1 | 11/2017 | Davis | |
| 2018/0013567 A1 | 1/2018 | Davis | |
| 2018/0323980 A1* | 11/2018 | Ahn | H04L 9/3236 |
| 2019/0034465 A1* | 1/2019 | Shimamura | G06Q 20/02 |
| 2019/0054836 A1* | 2/2019 | Haneda | B60L 53/65 |
| 2019/0156301 A1 | 5/2019 | Bentov et al. | |
| 2019/0199515 A1 | 6/2019 | Carver et al. | |
| 2019/0273733 A1* | 9/2019 | Kawabata | G06F 21/31 |
| 2019/0349733 A1 | 11/2019 | Nolan et al. | |
| 2020/0119936 A1* | 4/2020 | Balasaygun | H04L 12/1831 |
| 2020/0127834 A1* | 4/2020 | Westland | H04L 9/3221 |
| 2020/0136808 A1* | 4/2020 | Chasko | H04L 63/12 |
| 2020/0162473 A1* | 5/2020 | Mercuri | G06Q 20/065 |
| 2020/0210451 A1* | 7/2020 | Wang | G06Q 20/02 |
| 2020/0234293 A1* | 7/2020 | Lee | G06Q 20/3827 |
| 2020/0285634 A1* | 9/2020 | Jho | H04L 9/50 |
| 2020/0366495 A1* | 11/2020 | Mahoney | H04L 9/12 |
| 2021/0326442 A1 | 10/2021 | Campagna et al. | |
| 2021/0365867 A1* | 11/2021 | Kim | G06Q 10/06398 |
| 2022/0094791 A1* | 3/2022 | Moller | H04M 3/5238 |
| 2022/0100724 A1* | 3/2022 | Zhang | G06F 16/27 |

FOREIGN PATENT DOCUMENTS

| | | |
|---|---|---|
| WO | 20180224954 | 12/2018 |
| WO | 2019003083 A1 | 1/2019 |
| WO | 2019021107 | 1/2019 |
| WO | 2019077126 | 4/2019 |
| WO | 2020208596 A1 | 10/2020 |

OTHER PUBLICATIONS

Sarda et al., NoCo: An Efficient Transaction Propagation Protocol for Open Blockchains, Sep. 1, 2018, 2018 Second International Conference on Advances in Computing, Control and Communication Technology (IAC3T) (pp. 41-47) (Year: 2018).*
Sudhan et al., Peer Selection Techniques for Enhanced Transaction Propagation in Bitcoin Peer-to-Peer Network, Jun. 1, 2018, 2018 Second International Conference on Intelligent Computing and Control Systems (ICICCS) (Year: 2018).*
A. Pinar Ozisik et al., Graphene: A New Protocol for Block Propagation Using Set Reconciliation, UMASS Amherst, pp. 1-65, Massachusetts, USA.
Ding D., et al., "Txilm: Lossy Block Compression with Salted Short Hashing," arXiv:1906.06500, Jun. 15, 2019, 5 pages.
Han Y., et al., "Shrec: Bandwidth-Efficient Transaction Relay in High-Throughput Blockchain Systems," Proceedings of the 11th ACM Symposium on Cloud Computing (SoCC 20), Oct. 19-21, 2020, pp. 238-252.
International Search Report and Written Opinion for Application No. PCT/EP2021/082871 mailed on Feb. 25, 2022, 14 pages.
Katkuri S., "A Survey of Data Transfer and Storage Techniques in Prevalent Cryptocurrencies and Suggested Improvements," arXiv:1808.03380, Aug. 10, 2018, 72 pages.
GB 1905221.6 Search Report dated Oct. 9, 2019.
Matt Corallo, "Compact Block Relay", Apr. 27, 2016, Retrieved from the Internet: URL: https://github.com/bitcoin/bips/blob/master/bip-0152.mediawiki.
PCT/IB2020/053436, International Searching Authority, International Search Report dated Jul. 3, 2020.
PCT/IB2020/053416, International Searching Authority, International Search Report dated Jun. 26, 2020.
Pinar Ozisik A et al., "Graphene: A New Protocol for Block Propagation Using Set Reconciliation", Sep. 13, 2017, Pervasive: International Conference on Pervasive Computing; Springer, Berlin Heidelberg, pp. 420-428.
Antonopoulos A.M., et al., "Bitcoin and a Blockchain," First Edition, NTT Publication Incorporated company, Apr. 18, 2018, 11 Pages.
Office Action for Japanese Patent Application No. 2021-560040, mailed on May 21, 2024, 5 pages.

* cited by examiner

| Field size (Bytes) | Name | Data type | Description |
|---|---|---|---|
| 4 | Version | int32_t | Block version information (note, this is signed) |
| 32 | prev_block | char[32] | The hash value of the previous block this particular block references |
| 32 | merkle_root | char[32] | The reference to a Merkle tree collection which is a hash of all transactions related to this block |
| 4 | timestamp | uint32_t | A Unix timestamp recording when this block was created (Currently limited to dates before the year 2106) |
| 4 | bits | uint32_t | The calculated difficulty target being used for this block |
| 4 | nonce | uint32_t | The nonce used to generate this block. This variable is iterated until the hash of the block header |
| 1+ | txn_count | varint | Number of transaction entries |
| ? | txns | tx[] | Block transactions, in format of 'tx' command |

METHODS AND DEVICES FOR PROPAGATING BLOCKS IN A BLOCKCHAIN NETWORK

CROSS REFERENCE TO RELATED APPLICATIONS

This application is the U.S. National Stage of International Application No. PCT/IB2020/053416 filed Apr. 9, 2020, which claims the benefit of United Kingdom Patent Application No. 1905221.6, filed Apr. 12, 2019, the contents of which are incorporated herein by reference in their entireties.

TECHNICAL FIELD

The present disclosure relates to blockchain networks and, in particular, to the propagation of blocks amongst miner nodes.

BACKGROUND

In proof-of-work blockchain systems, when a miner finds a valid block it tries to quickly communicate its success to all other miners. This involves propagating information regarding the block through the blockchain network to all the mining nodes. In some cases, this may involve sending the full block data. In some cases, this may involve sending block header and transaction list information. Receiving miners validate the new block by hashing the header and confirming it matches the hash value provided by the successful miner.

As blocks increase in size and transaction count, delay in block propagation can exacerbate the problems of temporary forks and orphan blocks. These situations are costly to miners and to the system overall.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

In one aspect, there may be provided a computer-implemented method of block propagation in a blockchain network. The method may include, while hashing a first block header of a first candidate block at a first mining node, sending, to other mining nodes, a first message specifying transactions and their order in a first ordered set contained in the first candidate block; and receiving a second message identifying transactions and their order in a second ordered set contained in a second candidate block being mined by a second mining node.

In some implementations, receiving the second message includes storing the second ordered set of transactions in association with a second mining node identifier in memory at the first mining node.

In some implementations, the method may further include receiving a coinbase transaction and second block header information from the second mining node indicating successful completion of a proof-of-work with regard to the second candidate block, wherein the second block header information includes at least a timestamp and a nonce; assembling a second block header based on the second ordered set of transactions, the coinbase transaction, and the second block header information; and validating the second candidate block by hashing the second block header to validate the proof-of-work. In some cases, assembling includes determining a Merkle root from the second ordered set of transactions and the coinbase transaction.

In some implementations, the method may further include finding a proof-of-work in association with a nonce in the first block header of the first candidate block by hashing the first block header to produce a hash value below a difficulty threshold and, as a result, sending the other mining nodes a coinbase transaction from the first candidate block and first block header information, wherein the first block header information includes at least a timestamp and the nonce; and adding the first candidate block to a local copy of the blockchain. In some cases, the first block header information excludes at least some header fields. In some cases, the first mining node does not resend the first ordered set of transactions to the other mining nodes after finding the proof-of-work.

In some implementations, the method may include first building the first candidate block by selecting and ordering transactions from a mempool to create the first ordered set of transactions and adding a coinbase transaction.

In some implementations, the first message includes a first template identifier that is based on a first mining node identifier and a block level indicator. In some examples, the first template identifier is obtained from a hash of a concatenation of (a) the first mining node identifier and (b) a hash value associated with a previous block in the blockchain.

In some implementations, the first message and the second message contain compressed transaction identifiers for specifying the transactions in the first ordered set of transactions and the transactions in the second ordered set of transactions. In some examples, the compressed transaction identifiers are truncated transaction identifiers.

In some implementations, the first ordered set of transactions in the first message is encrypted, and wherein a decryption key for decrypting the first ordered set of transactions is provided to the other miners only if the first mining node finds a proof-of-work for the first candidate block.

In another aspect, there may be provided a computing device implementing a first mining node for mining blocks on a blockchain. The computing device may include memory, one or more processors, and computer-executable instructions that, when executed, cause the processors to carry out one or more of the methods described herein.

In yet another aspect, there may be provided a computer-readable medium storing processor-executable instructions for implementing a first mining node for mining blocks on a blockchain network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Examples include, but are not limited to, SHA-2, SHA-3, and BLAKE2. Any reference below to a miner hashing a block or a candidate block will be understood to mean applying a cryptographic hash function to the header portion of the candidate block.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin, as exemplified by the Bitcoin SV protocol, may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In the Bitcoin example, a POW involves hashing a block header containing a nonce until the result is below a threshold value set by a difficultly parameter. The nonce is repeated incremented and the hashing repeated until the result is below the threshold value or until the miner receives notice that another miner has succeeded. Variations in mining process will be familiar to those ordinarily skilled in the art.

Figure 1:
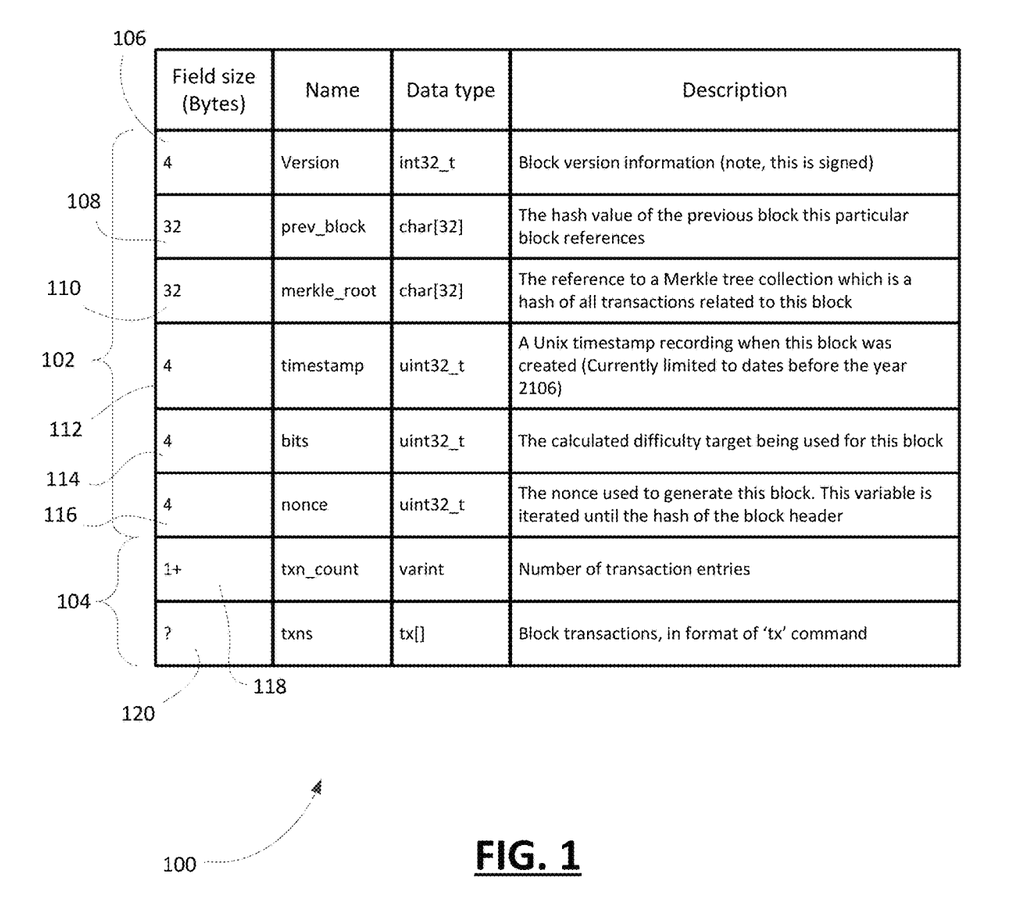
FIG. 1 shows an example block structure for a blockchain network.

A typical block contains two data structures: a block header and transactions. FIG. 1 diagrammatically illustrates an example block structure 100 from the Bitcoin protocol. The block structure 100 includes a block header 102 and a payload 104. The block header 102 in this example includes fields for a version number 106, a previous block hash value 108, a Merkle root 110, a timestamp 112, a target difficulty parameter 114, and a nonce 116. The previous block hash value 108 chains this block to the previous block in the chain, thereby resulting in the "blockchain" structure that links successive blocks together through cryptographic hashes. The Merkle root 110 refers to a Merkle tree structure based on all the transactions contained in the block. The nonce 116 is an arbitrary value that the mining node can repeated increment or decrement to change the contents of the block header 102 in order to produce different hash results when mining.

The payload 104 includes a transaction count value 118 and the list of transactions 120. The list of transactions 120 may be a list of transaction ID numbers in some implementations.

When a mining node succeeds in finding a block header that produces a hash result that is below the threshold value, then it proceeds to notify other nodes using an updated inventory message that includes the successful hash result value. The other nodes then request a copy of the new block and independently verify its validity.

The blockchain ecosystem is maturing to provide increased usability through a large increase in transaction volume and, as a consequence, block sizes. As blocks become larger, in some cases exceeding 128 MB, propagating a successfully mined new block to other nodes throughout the network takes an increased time. The delay in propagation comes at a cost. First, the miners that are unaware of that a successfully-mined block has been created will continue attempting to mine their own candidate blocks in a wasted effort if the new block proves to be valid. Second, the delay in propagation and validation may result in an increased likelihood of (temporary) forks and orphan blocks.

It will be appreciated that in many blockchain protocols, the miner does not send a full copy of the block, but instead sends the hash results in an inventory message. The receiving mining nodes determines that they have not seen this alleged new block and send a GETBLOCK or GETDATA message to the successful miner. Rather than sending a full copy of the block, the successful miner send the block header, the transaction count field from the payload, and an ordered list of the transactions included in the block. The ordered list may include a set of the full transaction ID numbers (TXIDs) for the transactions. The TXIDs may, in some embodiments, be a fixed length hash of the transaction. The TXID may be a 256-bit (32-byte) number obtained by hashing the transaction using SHA-256 for instance. A receiving node may reassemble the full block by retrieving the identified transactions from the mempool by their TXIDs.

Nevertheless, as modern block sizes grow to 128 MB and beyond the size of the data to be transmitted may still be significant if the count of transactions is large. For example, a block containing half a million transactions would have an ordered list of TXIDs that is 16 MB.

Accordingly, in one aspect, the present application describes methods and systems for blockchain networks in which mining nodes provide other miners with information about their respective candidate blocks while hashing their candidate blocks. In this manner, each miner exploits the time delay between the discovery of successful blocks, which in the example of Bitcoin is about ten minutes, to provide other miners with details regarding the structure and content of candidate blocks. By providing this information in advance, when a successful block is found the successful miner need only send information from the block header and, in some cases, a coinbase transaction in order to ensure all other nodes can assemble and validate the complete new block. This data may be as little as a few hundred bytes. This increases the speed with which a successful new block is propagated through the full network.

It will be appreciated that unconfirmed transactions are propagated and validated through the network of nodes before they are confirmed by being included in a valid block. While in this unconfirmed state, the unconfirmed transactions are held in memory. This memory may be termed a "mempool". Each miner may, in some implementations, maintain its own copy of the mempool from which it can select a set of transactions for assembling a candidate block. In some alternative architectures, the mempool may be implemented as a distributed mempool across a number of nodes. In some architectures, specialized nodes may be employed by the blockchain network to manage the mempool and to provide mining nodes with transactions for inclusion in a candidate block. The present application contemplates use of the described methods and devices with any such variations in blockchain network architecture. For the purposes of simplicity of explanation, it will be assumed herein that each mining node maintains its own mempool of unconfirmed transactions.

The mining nodes use the mempool as a source of new transactions for building a candidate block. The mining nodes may further use the mempool when validating a new block from another miner as each block contains an ordered list of transactions. The ordered list may identify transactions by a unique transaction identifier, like the TXID. Accordingly, the receiving mining node retrieves the transactions from the ordered list and validates the block against block-level criteria and validates the transactions against transaction-level criteria. In this way the miners guard against double-spends and other attacks.

Figure 2:
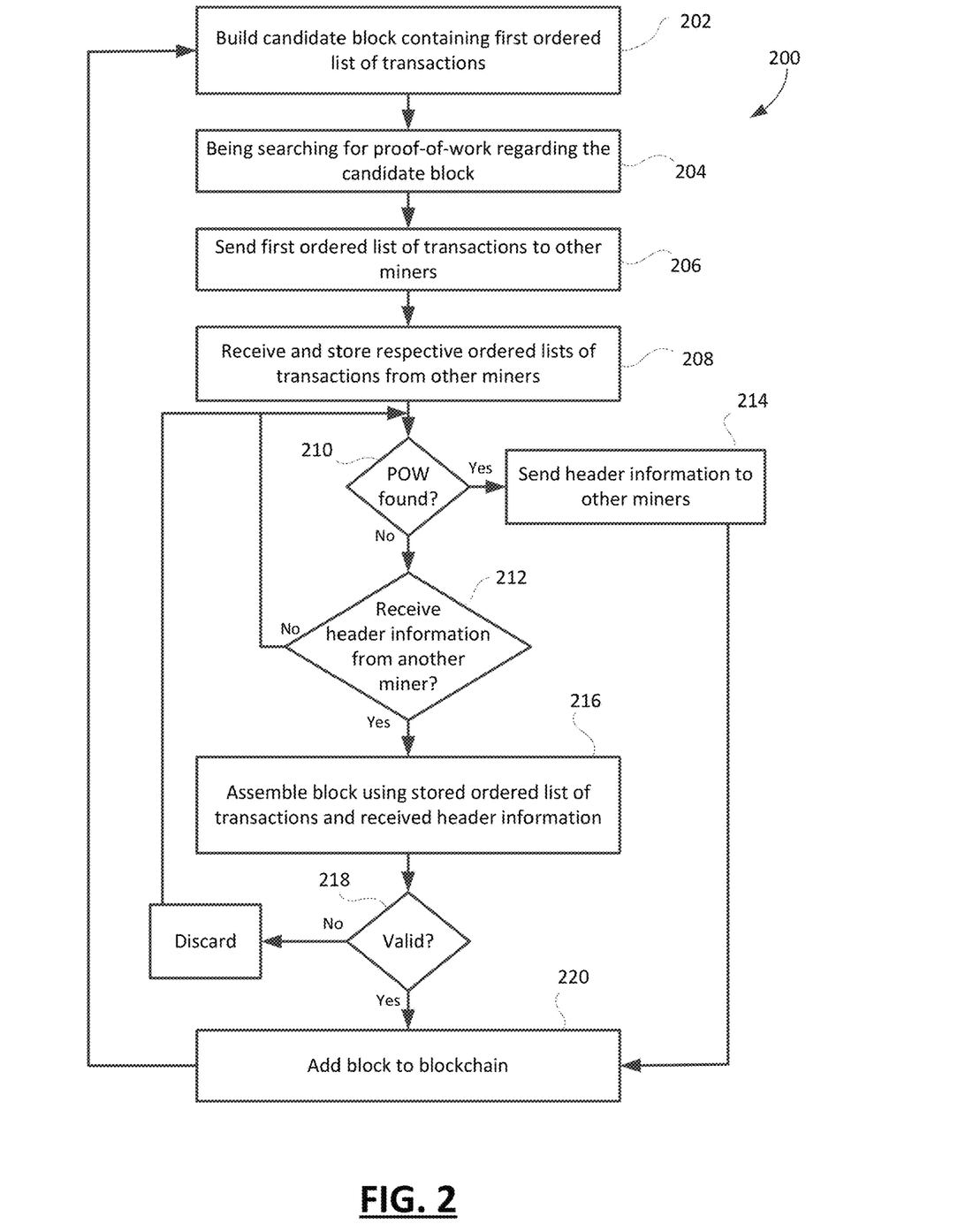
FIG. 2 shows a flowchart of an example method of block propagation.

To illustrate an aspect of the present application, reference is now made to FIG. 2, which shows, in flowchart form, one example method 200 of blockchain mining. The method 200 is implemented by a mining node. The mining node may be implemented on a computing device, which may include one or more processing units. As will be appreciated by those skilled in the art the processing units may include specialized processing units with dedicated hardware designed to carry out the calculation operations associated with blockchain mining with significant speed and efficiency. However, it may also or alternatively include general purpose computing device. The computing device includes processor-executable software that includes processor-readable instructions that, when executed, cause the one or more processing units to carry out the operations described. The computing device includes memory and a network connection with the associated hardware and software for obtaining network connectivity and sending and receiving messages in accordance with the applicable network protocol.

The method 200 includes selecting a set of transactions from the mempool of unconfirmed transactions to build a candidate block in operation 202. The selection may be based on age of the transactions, fees payable for mining the transactions, or any other factors. The transactions form an ordered list of transactions. The mining node further determines the Merkle root based on the ordered list of transactions and forms the block header, including setting an initial value for the nonce in the header.

In operation 204, the mining node begins the repeated hashing of the block header and incrementing of the nonce as part of the search for a POW that meets the conditions of the difficulty setting. While engaged in searching for a POW with regard to its candidate block, the mining node sends information about its ordered list of transactions to other mining nodes, as indicated by operation 206. The mining node also receives messages from other mining nodes, while operation 204 is ongoing, that include information about the respective ordered lists of transactions in the candidate blocks being worked upon by those mining nodes, as indicated by operation 208. It will be appreciated that although operations 204, 206 and 208 are shown in sequence, they generally happen in parallel. The received information about respective ordered lists of transactions from other miners is stored locally by the mining node. The mining node may store the information in a table or other data structure.

The search for a POW continues until the mining node successfully finds a POW, as indicated by operation 210, or receives notice from another mining node that it has found a POW, as indicated by operation 212. If the mining node finds a POW, then in operation 214 it send some header information to other mining nodes to propagate the block details. Notably, it does not need to send the payload. It may, however, send a coinbase transaction.

If the mining node receives header info from another mining node, then in operation 216 it assembles the new block based on the stored ordered list of transactions for that mining node. If a coinbase transaction is received, then that transaction is added to the block and the mining node can construct the Merkle tree to confirm that the Merkle root is valid. The mining node then validates the new block in operation 218 and, if invalid, it may discard the new block and continue searching for its own POW. Note that there may be certain validity checks that, if failed, may prompt the mining node to take other action such as requesting additional data from the successful mining node, as will be described later. If the block is validated, it is added to the blockchain in operation 220 and propagated to further mining nodes. The mining node then returns to operation 202 to build a new candidate block and start the search anew.

It will be appreciated that the described method of pre-distributing candidate block information so that each miner knows the ordered list of transactions for each other miner, ensures only a minimum amount of information need be propagated after the POW is found. This ensures that mining nodes have the information they require to validate a new block as soon as possible, thereby reducing time wasted in search for a POW when another miner has already succeeded. Mining nodes have every incentive to propagate and validate new blocks as quickly as possible so that they can move onto searching for the next block. Potential delays due to network latency are of much less concern when pre-distributing ordered lists of transactions during the approximately ten-minute period between successive blocks.

In one example implementation, the ordered list of transactions from a candidate block may be communicate to another miner by adding ordering information to a transaction data packet. Each miner is able to identify each other miner uniquely. In one example implementation, a message may be sent that uniquely identifies the miner and the block level that the miner is working on, and that lists the TXIDs for that miner's candidate block in order.

In another example implementation, the messaging protocol may provide for appending transactions to an ordered list for a miner, removing or deleting transactions from an ordered list, replacing a transaction with another transaction, or re-ordering transactions. In the normal course, a miner is likely to use only an "add" message that specifies the ordered list of transactions. However, there are some cases in which a miner may wish to remove or replace a transaction. For example, subsequently-received information may indicate a potential double-spend with regard to one of the transactions or some other potential issue with its validity. As another example, the miner may cycle through all increments of the nonce and may wish to reorder or otherwise adjust the transactions so as to change the Merkle root and thereby change the header to continue mining the block. The precise format the message structures may vary by implementation.

Further compression of the block propagation messages can be achieved by shortening the TXID string. The TXID in some examples is a 32 byte string. However, in some cases a compressed TXID may be used that relies on sending only a portion of the TXID. In one example, only the first eight bytes are sent.

Although the first 8 bytes of a TXID is not guaranteed to uniquely identify a transaction, the likelihood of collision in two TXIDs, both within a single message or in general is small. Given that SHA256 outputs are pseudorandom 256-bit strings, the exact likelihood of collision of two random TXID, i.e. the likelihood that any two TXIDs have the same first 4 bytes is:

$$P('TXID_1[0:8] = TXID_2[0:8]') = \frac{1}{2^{8 \times 8}}$$
$$= 0.0000000000000000000542$$

Where $TXID_i[0:n]$ means 'the first n bytes of $TXID_i$'. Furthermore, the likelihood that a message containing N compressed TXIDs will contain one or more collisions may be expressed as:

$$P(>0 \text{ collisions in } N \text{ TxIDs}) =$$
$$1 - P(TXID_i[0:8] \neq TXID_j[0:8] \text{ for } i, j \in \{1, \ldots, N\} i \neq j) =$$
$$1 - \left(1 - \frac{1}{2^{64}}\right)^{\frac{N(N-1)}{2!}} = 1 - 0.9999999999999999999458^{\frac{N(N-1)}{2!}}$$

As an example, if a block were to contain a million transactions such that a message contained a million compressed TXIDs (N=1,000,000), then the likelihood of a collision is:

$$P(>0 \text{ collisions in } 1{,}000{,}000 \text{ TxIDs}) = 0.0000000271$$

This probability is very small and, even if a collision occurs, the message receiver may simply request the same message in uncompressed form. Alternatively, the sending mining node may first conduct a check to confirm that the ordered set of compressed TXIDs does not contain any collisions before sending and, if any are detected, send the message with uncompressed TXIDs. A flag or other signal in the message may indicate whether the TXIDs in the payload are in compressed or uncompressed format.

In accordance with the process described herein, each miner involved in the blockchain network may receive messages from each other miner specifying an ordered list of transactions contained that other miner's candidate block. To track this information, each miner may store the ordered lists in association with the respective miner identities. The miner identities may be determined by IP address or some other unique identifier. In one example implementation, each miner maintains a table or similar data structure in which each row is associated with one of the transactions in the mempool and each column is associated with a miner in the network. Order information may then be stored in the cells of the table indicating for each miner the order in which the miner has arranged the transactions in its candidate block. It will be understood that not all transactions will have an order value as not all transactions are included in every candidate block. The table below shows one simplified example of a miner ordering data table:

| TXID Miner ID | A | B | C | D |
| --- | --- | --- | --- | --- |
| $TX_1$ | 1 | 2 | 1 | 1 |
| $TX_2$ | 2 | 1 | 3 | 4 |
| $TX_3$ | 3 | 3 | 2 | 2 |
| $TX_4$ | 4 | 4 | 4 | 5 |
| $TX_5$ | 5 | 5 | 5 | 3 |

In this simplified example table, there four miners having miner IDs A, B, C, and D. Each miner has received and validated transactions $TX_1$, $TX_2$, $TX_3$, $TX_4$ and $TX_5$. The table can be updated to add transactions to a miner's ordered list, to replace a transaction in the order with another, or to delete a transaction from the ordered list, which may result in adjusting the ordering of the remaining transactions in that ordered list.

When a miner, such as miner A, receives a block header message from, for example miner C, indicating that a block has been found, the miner A builds the Merkle tree based on the TXIDs and the order specified for miner C. Miner A hashes the block header to verify the hash value. If the block is verified, then miner A constructs the full block with transaction data in the specified order, adds it to the blockchain, and builds a new candidate block to continue mining.

In some example implementations, the block header sent by a successful miner does not contain all fields. For example, it may contain only the nonce and the timestamp, along with the hash value obtained by miner C when hashing the full block header. The receiving miner may add the missing fields, such as the version, the prey block hash, the Merkle root that the miner has calculated, and the difficulty setting. It can then validate the reconstructed header by hashing it can comparing it to the received hash value.

In some example implementations, the messaging from miners indicating their ordered list of transactions for their respective candidate blocks is sent automatically once a candidate block is built. In some other example implementations, the ordered list information is provided in response to a request from another miner.

In some implementations, a template identifier TmID may be defined. The template identifier is specific to a miner and to a block level, so that it effectively refers to a specific candidate block, i.e. a specific ordered list of transactions. Any messaging from a miner relating to its ordered list of transactions may include the template identifier to ensure that receiving miners associate the changes with the correct specific ordered list of transactions. In one implementation, the template identifier may be a hash of a miner identifier (miner ID) and the prey block field in the block header, i.e. the hash of the previously block:

$$TmID = H(\text{prev block} \| \text{miner ID})$$

This ties the template identifier to a block level and specific miner.

Each message relating to ordered lists of transactions may include the template identifier, and may further include a sequence number. The sequence number may be an unsigned integer value used to indicate the order of messages from one miner relative to one another. Sequencing is helpful to a message receiver to uniquely determine the TXID ordering for a specific miner in the case that some messages are not received or are received out of order.

As mentioned above, miner ID may be a mining node's IP address or some other unique identifier for the mining node. In some embodiments, an initial authentication operation may occur when the miner attaches to the network that results in associating a unique miner ID to that mining node. The authentication operation may include a handshaking operation in which each miner provides a public key and digital signature. Authentication is connected to verification of the digital signature. In some cases, the miner ID may be based on the public key, the digital signature, or some combination thereof.

In some instances, the handshaking operation during the authentication phase may include establishment of a shared secret amongst miners. Many techniques exist for establishing a shared secret. Subsequent messaging, such as messaging relating to the ordered list of transactions, may be encrypted for confidentiality and to reduce the possibility of man in the middle attacks on the mining process.

In some embodiments, mining nodes carry out an authentication procedure after attaching to the network and opening a peer-to-peer connection with each other. The authentication procedure may involve sending an authentication challenge message and receiving an authentication response. Failure to receive a valid authentication response may result in the mining node closing or dropping the connection to that other mining node. In some cases, the mining node may have a different endpoint for an authenticated connection than its usual public network connection.

In one example implementation, the authentication challenge message includes a requesting mining node sending a message to the responding mining node. The message is one that the responding mining node has not previously seen. In some cases, the message may be a random code or string. The content of the message is not significant, but the responding mining node should not have seen the content before so that it cannot re-use previously generated material.

On receiving the authentication challenge message, the responding mining node concatenates the received message with a nonce value. The nonce value may be generated by the responding mining node using any pseudorandom process. The responding mining node then signs the concatenated nonce and message using the private key of a public-private key pair previously published. In these examples, the public-private key pair is related to the miner identity. In some cases, the public key may be the miner ID used in communications on the blockchain network. The requesting mining node may have a whitelist or other record of miner IDs (public keys) for mining nodes attached to the blockchain network.

Once the responding mining node has signed the concatenated nonce and message using its private key, it then generates and sends the authentication response message. The authentication response message may include the public key, e.g. the miner ID, the nonce value used, and the digital signature generated. The requesting mining node receives the authentication response message and may verify, using the public key, that the mining node is the owner of the public key and the public key matches with a key on the whitelist corresponding to a specific mining node.

The authentication response message may be sent with a corresponding authentication challenge message, so that the responding mining node may reciprocally authenticate the identity of the requesting mining node.

In one example, the format of the authentication challenge message may be of the form:

```
'authchallenge'
...
version: varint,
message_length: varint,
message: byte[]
...
```

In one example, the format of the authentication response message may take the form:

```
'authresponse'
...
public_key_length: byte,
public_key: byte[],
client_nonce: byte[32],
signature_length: byte,
signature: byte[]
...
```

In some implementations, the public key is an ECDSA key on the secp256k1 elliptic curve. The signature may be a signature over a concatenation of the nonce value and the content of the message field from the authentication challenge message. The concatenation may be (nonce|message) or (message|nonce), depending on the implementation.

Reference is now made to FIGS. 3A-3I, which diagrammatically illustrate example operating state and messaging flow between two miners in accordance with an implementation of the present application.

Figure 3A:
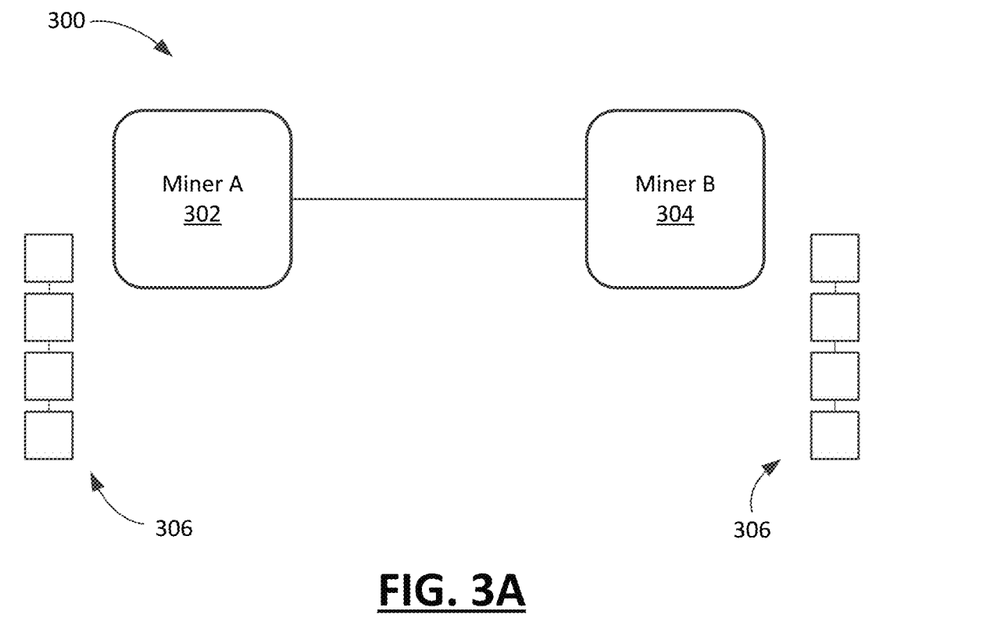
FIGS. 3A-3I illustratively show the sequence of messages and operations in an example implementation of block propagation in accordance with the present application.

In FIG. 3A, it will be seen that a first miner 302, Miner A, and a second miner 304, Miner B, are part of a blockchain network, and that there is an existing blockchain 306. The first miner 302 and the second miner 304 both have a locally-stored copy of the blockchain 306 in this example. The blockchain 306 is of a certain "height" or block level.

Figure 3B:
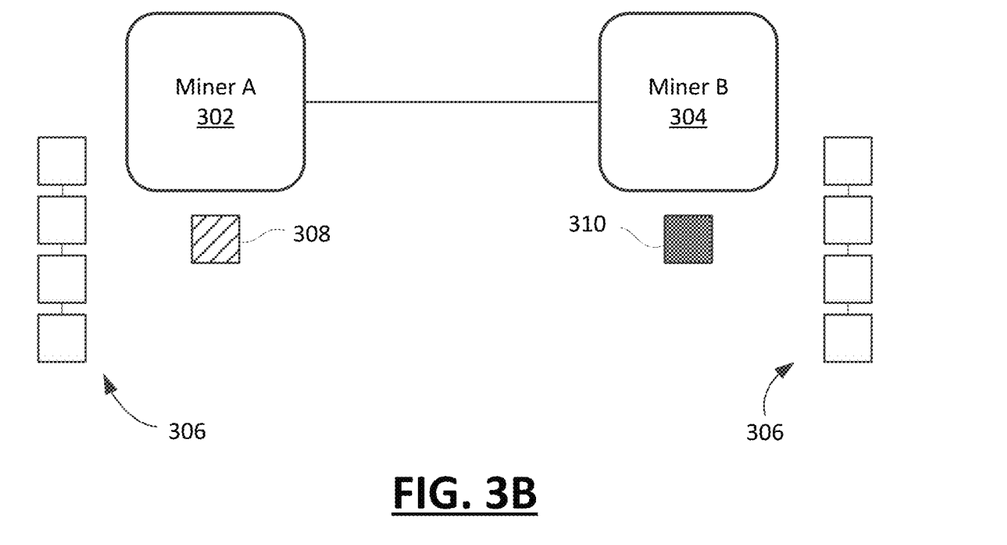

As indicated by FIG. 3B, each of the miners 302, 304 select a set of transactions from their respective mempools to build a candidate block. Specifically, the first miner 302 builds a first candidate block 308 containing a first ordered set of transactions, and the second miner 304 builds a second candidate block 310 containing a second ordered set of transactions. The first ordered set and the second ordered set may or may not contain the same transactions, and may or may not have them in the same or partially the same order, since the miners 302, 304 are free to select whichever transactions from the mempool that they wish and group them in whatever order they wish.

Figure 3C:
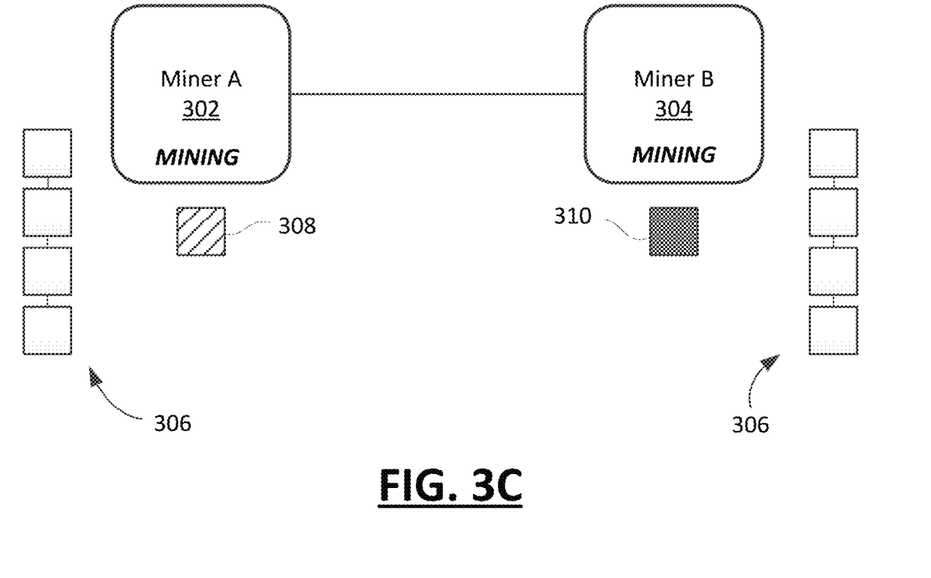

As shown in FIG. 3C, the miners 302, 304 begin mining the respective candidate blocks 308, 310 in an attempt to find a nonce that will result in a hash of the block header that is below the threshold value set by the difficultly.

Figure 3D:
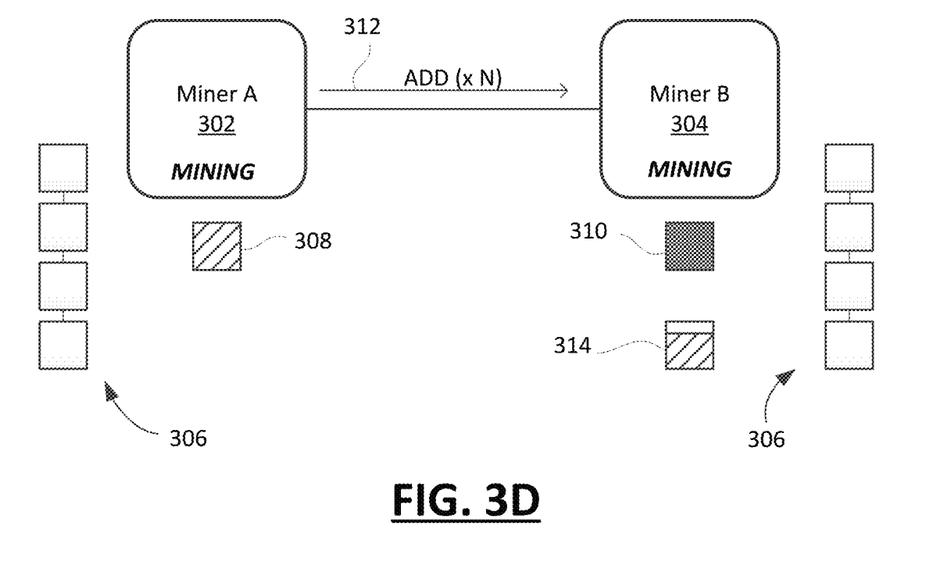

While searching for a successful proof-of-work, the miners 302, 304 exchange information about the ordered set of transactions in their respective candidate blocks 308, 310. As FIG. 3D illustrates, the first miner 302 may send an "add" message 312 to the second miner 304 providing the first ordered list of transactions from the first candidate block 308. From that information, the second miner 304 may build a template 314 of the first candidate block 308. In some example implementations, the template 314 may be the first ordered list of transactions in TXID form. In some example implementations, the template 314 may be a table, an example of which is provided above. In yet other example implementations, the template 314 may be a copy of the full candidate block, excluding certain unavailable header fields, including full transaction data.

Figure 3E:
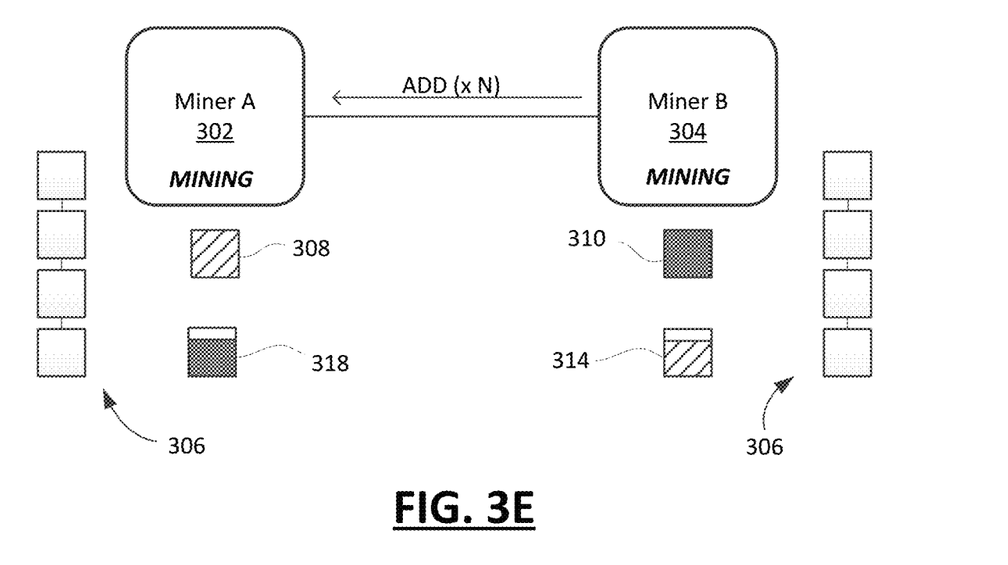

In a similar manner, the second miner 304 may send the first miner 302 an "add" message 316 containing the second ordered list of transactions from the second candidate block 310, as illustrated in FIG. 3E. From that data, the first miner 302 builds a template 318 of the second candidate block 310. Now each miner has their own candidate block which they each continue to mine, and a template of the candidate block being worked upon by the other miner.

Figure 3F:
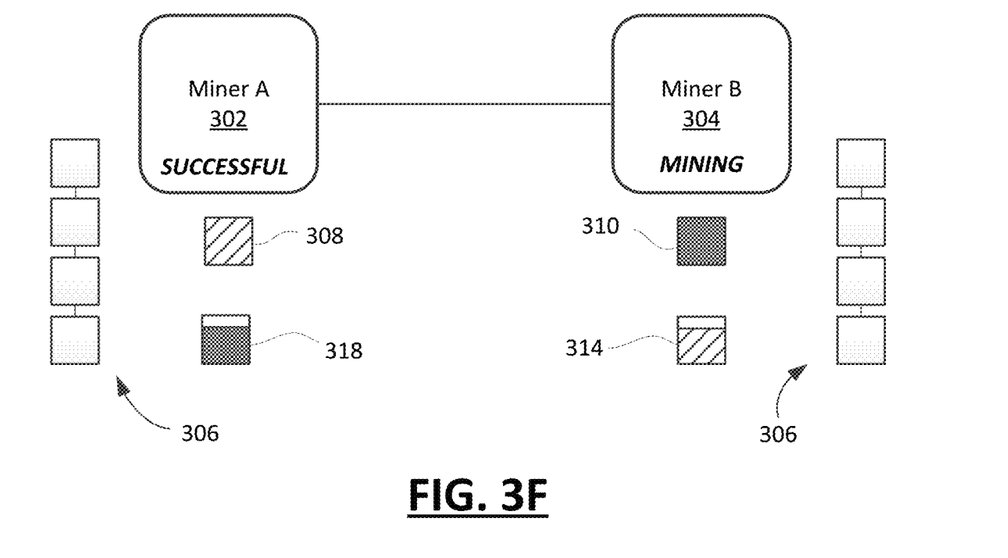
Figure 3G:
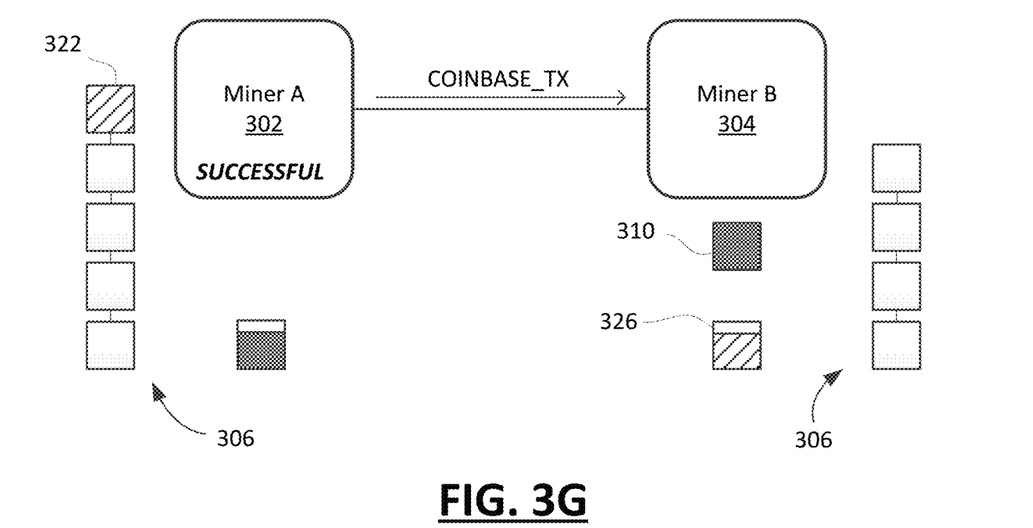
Figure 3H:
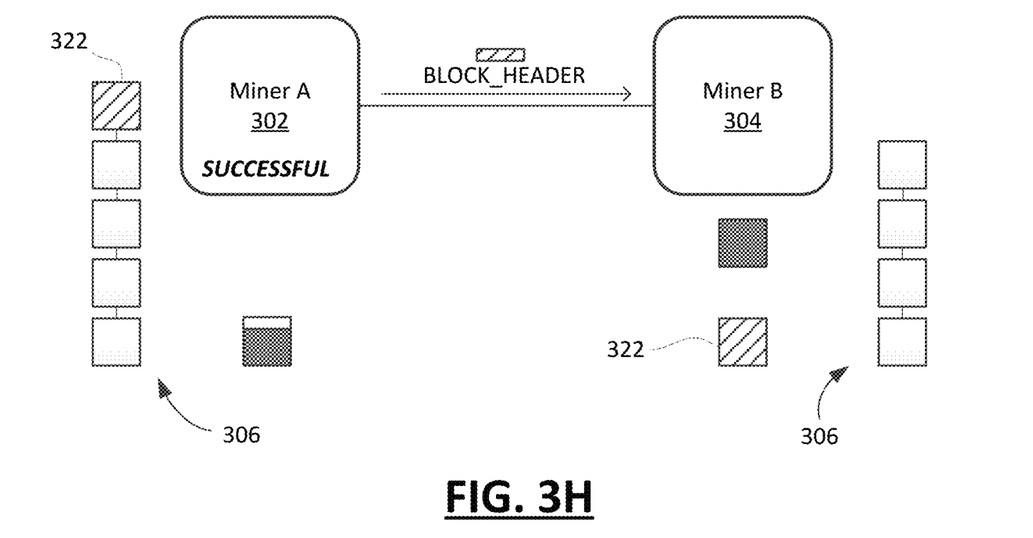

FIG. 3F shows that the first miner 302 has succeeded in finding a block header hash that meets the proof-of-work requirement. Accordingly, the first candidate block 308 with the most recently tested nonce in its header results in a valid block. FIGS. 3G and 3H then show that the first miner 302 adds the new block 322 to the blockchain 306 and transmits a message containing the coinbase transaction 320 and a message containing the block header information 324. The block header information 324 includes, at least, the nonce and a timestamp. It may or may not further include the other block header fields, such as the merkle root field. In some cases, this may be sent as part of the block header information 324, even though it can be calculated by the second miner 304, to enable the second miner 304 to double-check its Merkle root calculation. In some cases, the first miner 302 send the second miner 304 the full block header for the new block 322. The first miner 302 may also send the second miner 304 the hash value obtained from hashing the block header so that the second miner 304 can not only verify the hash falls below the difficultly threshold but also that it matches the hash that the first miner 302 purports to have found. The hash value may be send in the coinbase transaction message 320, in the block header information message 324 or in a separate message.

Once the second miner 304 has the coinbase transaction, it can complete the transaction portion of the template 314 of the first candidate block, and can therefore calculate the Merkle root. From that calculation it can verify that the merkle root field is accurate, if that field was included in the block header information message 324. If not, then it can complete the merkle root field and any other missing fields, like the version, prey block value, and bits field, in order to assemble the block header 326 for the new block 322. The other fields of the block header 326, like the nonce and timestamp, are provided by the block header information message 324. The second miner 304 may then validate the new block by hashing the assembled block header 326.

Figure 3I:
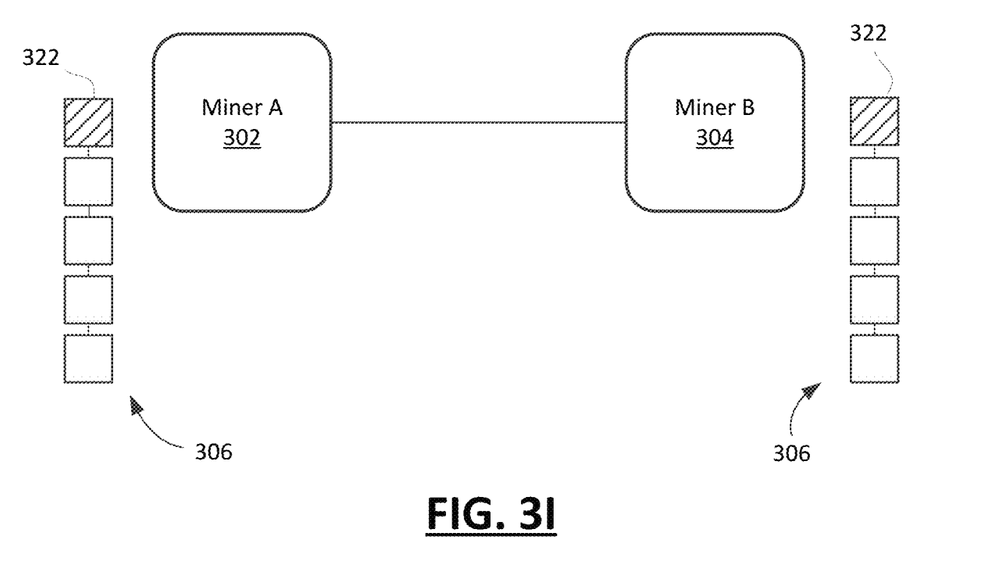

Assuming that the assembled block at the second miner 304 is validated, the second miner 304 then add that new block 322 to its copy of the blockchain 306, as shown in FIG. 3I.

Although the above-described sequence shows the coinbase transaction message 320 being sent prior to the block header information message 324, it will be understood that in some implementation the block header information message 324 may be sent first, or that both messages may be combined into a single message. Other variations in the order of operations or implementation details of a specific instance may be made without altering the overall functional operation of the described system and method.

It may be appreciated by those skilled in the art of blockchain networks that in some cases a block may be mined earlier than anticipated. In Bitcoin, for example, the difficulty setting provides for discovery of a valid block approximately every ten minutes, but the timing is not certain. It is possible that a valid block may be found much earlier. Moreover, some messages propagating transactions or transaction ordering information may encounter network delays in propagating through the network.

Accordingly, the possibility exists, albeit unlikely, that a valid block is found by a miner and the header information is sent to other miners, but at least one of those miner does not have all the transactions included in the block or has an incomplete or incorrect ordered list of transactions for the successful miner. When that miner attempts to validate the Merkle root field of the new block header, a mismatch will be found and the block considered invalid. One option is that the miner considers the block invalid and discards it. However, in another embodiment, the miner may send a request message to the successful miner for the set of Merkle leaves, i.e. the ordered list of TXIDs. Upon receiving the sent of leaves, the miner may then determine where the error in Merkle root calculation arose. If the cause is incorrect or incomplete ordering of transactions, the miner may update the ordering and verify the new block. If the cause is a missing transaction, the miner may request the new transaction and continue the verification process. Note that in some embodiments, a missing transaction may be detected prior to successful discovery of the block if a miner that receives an ordered list of transactions for another miner's candidate block finds that it does not have one of the TXIDs in its mempool. In that case, the receiving miner can request a copy of that transaction and update its mempool.

Is some implementations, one or more miners may wish to maintain some confidentiality over its transaction selection and ordering. In such implementations, it may be possible for a miner to encrypt its ordered list of transactions when distributing it during the mining phase. If a valid block is found, then the miner distributes a decryption key together with the header information and/or the coinbase transaction, then permitting the receiving miners to decrypt the ordered list of transactions and validate the new block.

The following table describes one set of example messages for one illustrative implementation of the messaging for propagation of ordered transaction lists amongst miners:

| Value | Field Size (Bytes) | Data type | Name | Description |
|---|---|---|---|---|
| 0 | 32 + 4 | char[32] + varInt | get_chunk | Request for chunk of TXIDs The first 32 bytes is a template ID and the 4 bytes is a sequence number. |
| 1 | 32 + 4 + 4 + 32 * N | char[32] + varInt + varInt + char[32] | add | Add a list of TXIDs (chunk) to the message sender's candidate block. The first 32 bytes is the template ID, the second 4 bytes is the |

-continued

| Value | Field Size (Bytes) | Data type | Name | Description |
|---|---|---|---|---|
| | | | | sequence number. The third 4 bytes is the length of the rest of the message containing the N TXIDs chunk payload. |
| 2 | 32 + 4 + 4 + 4 * N | char[32] + varInt + varInt + char[32] | cadd | Add a list of transaction hashes (chunk) to the message sender's candidate block. The first 32 bytes is the template ID, the second 4 bytes is the sequence number. The third 4 bytes is the length of the rest of the message containing the N compressed TXIDs chunk payload. |
| 3 | 32 + 4 + 4 + 32 | char[32] + varInt + varInt + char[32] | replace | Replace a transaction hash in the list of message sender's transactions. The first 32 bytes is the template ID, the next 4 bytes is the sequence number. The next 4 bytes indicates the position of the tx hash within the chunk. The last 32 bytes is the replacement tx hash |
| 4 | 4 + 4 + 4 | char[32] + varInt + varInt | creplace | Replace (compressed) transaction hash in the message sender's candidate block. The first 4 bytes is the tx hash and the last 4 bytes is the sequence number indicating the position of the tx in the message sender's block. |
| 5 | 4 + 4 | varInt + varInt | delete | Delete the tx hash in the position indicated by the 4-byte int |
| 6 | 80 | char[32] | block_header | Block header data packet. This notifies a peer of a new block header. The block header fields are converted to string variables and concatenated into a single 80-byte string. This message is sent in conjunction with a valid coinbase_tx message. |
| 7 | 111-120 | char[32] | coinbase_tx | Message containing the (raw) coinbase tx for a successful miner. This message is sent in conjunction with a block_header message. |

A receiving miner modifies the candidate block template corresponding to the template identifier in the message. Messages received out of sequence, according to sequence number, for a particular template identifier may be queued until intervening messages are received.

In all likelihood, the receiving miner has the applicable transactions corresponding to the TXIDs in its mempool, but if a transaction is missing, then it can request a copy of any missing transactions.

It will be appreciated that the above-described illustrative messaging protocol is one example implementation.

It will be appreciated that it may be that some or all of the above-described operations of the various above-described example methods may be performed in orders other than those illustrated and/or may be performed concurrently without varying the overall operation of those methods.

Figure 4:
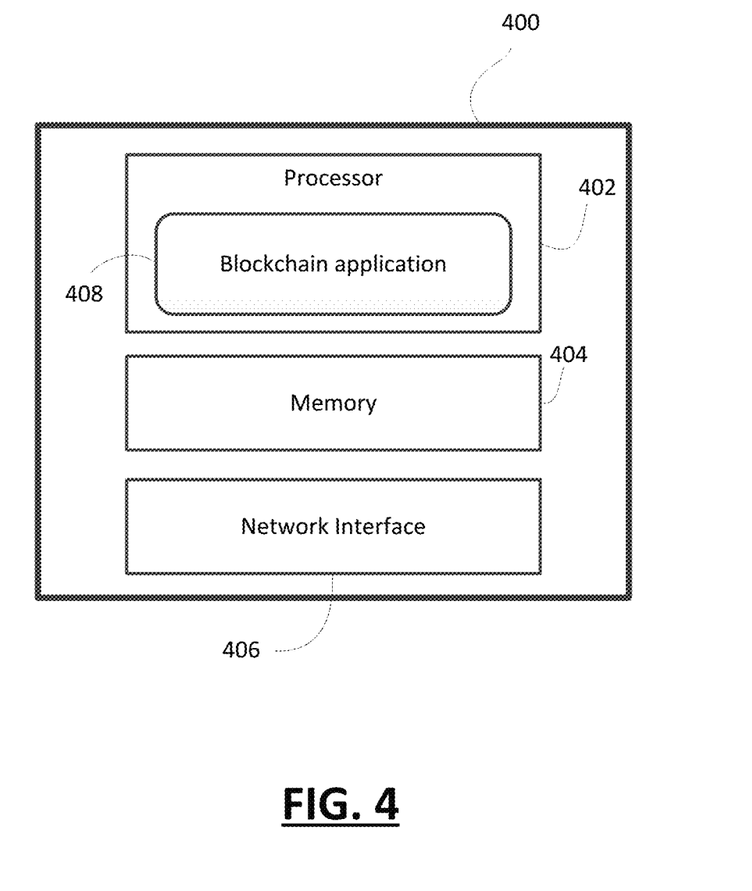
FIG. 4 shows, in block diagram form, a simplified example of a mining node.

Reference is now made to FIG. 4, which shows, in block diagram form, a simplified mining node 400, in accordance with an example of the present application. The mining node 400 includes a processor 402, which may include one or more microprocessors, application specific integrated circuits (ASICs), microcontrollers, or similar computer processing devices. The mining node 400 may further include memory 404, which may include persistent and non-persistent memory, to store values, variables, and in some instances processor-executable program instructions, and a network interface 606.

The mining node 800 may include a processor-executable blockchain application 408 containing processor-executable instructions that, when executed, cause the processor 402 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of block propagation in a blockchain network, comprising:
   while hashing a first block header of a first candidate block at a first mining node,
      sending, to other mining nodes, a first message specifying transactions and an order of the specified transactions in a first ordered set contained in the first candidate block;
      receiving a second message identifying transactions and an order of the identified transactions in a second ordered set contained in a second candidate block being mined by a second mining node;
      receiving a transaction and second block header information from the second mining node indicating successful completion of a proof-of-work with regard to the second candidate block, wherein the second block header information includes at least a timestamp and a nonce;
      assembling a second block header based on the second ordered set of transactions, the transaction, and the second block header information; and
      validating the second candidate block by hashing the second block header to validate the proof-of-work.

2. The method of claim 1 wherein receiving the second message includes storing the second ordered set of transactions in association with a second mining node identifier in memory at the first mining node.

3. The method of claim 1, wherein assembling the second block header includes determining a Merkle root from the second ordered set of transactions and the transaction.

4. The method of claim 1, further comprising first building the first candidate block by selecting and ordering transactions from a mempool to create the first ordered set of transactions and adding a coinbase transaction.

5. The method of claim 1, wherein the first message includes a first template identifier that is based on a first mining node identifier and a block level indicator.

6. The method of claim 5, wherein the first template identifier is obtained from a hash of a concatenation of (a) the first mining node identifier and (b) a hash value associated with a previous block in the blockchain.

7. The method of claim 1, wherein the first message and the second message contain compressed transaction identifiers for specifying the transactions in the first ordered set of transactions and the transactions in the second ordered set of transactions.

8. The method of claim 7, wherein the compressed transaction identifiers are truncated transaction identifiers.

9. The method of claim 1, wherein the first ordered set of transactions in the first message is encrypted, and wherein a decryption key for decrypting the first ordered set of transactions is provided to the other miners only if the first mining node finds a proof-of-work for the first candidate block.

10. A computer-implemented method of block propagation in a blockchain network, comprising:
    while hashing a first block header of a first candidate block at a first mining node,
       sending, to other mining nodes, a first message specifying transactions and an order of the specified transactions their order in a first ordered set contained in the first candidate block;
       receiving a second message identifying transactions and an order of the identified transactions their order in a second ordered set contained in a second candidate block being mined by a second mining node; and
       finding a proof-of-work in association with a nonce in the first block header of the first candidate block by hashing the first block header to produce a hash value below a difficulty threshold and, as a result,
          sending the other mining nodes a coinbase transaction from the first candidate block and first block header information, wherein the first block header information includes at least a timestamp and the nonce; and
          adding the first candidate block to a local copy of the blockchain.

11. The method of claim 10, wherein the first block header information excludes at least some header fields.

12. The method of claim 10, wherein the first mining node does not resend the first ordered set of transactions to the other mining nodes after finding the proof-of-work.

13. The method of claim 10, wherein the first message includes a first template identifier that is based on a first mining node identifier and a block level indicator.

14. The method of claim 13, wherein the first template identifier is obtained from a hash of a concatenation of (a) the first mining node identifier and (b) a hash value associated with a previous block in the blockchain.

15. The method of claim 10, wherein the first message and the second message contain compressed transaction identifiers for specifying the transactions in the first ordered set of transactions and the transactions in the second ordered set of transactions.

16. The method of claim 15, wherein the compressed transaction identifiers are truncated transaction identifiers.

17. A computing device implementing a first mining node for mining blocks on a blockchain network, the computing device including:
    one or more processors;
    memory;
    computer-executable instructions stored in the memory that, when executed by the one or more processors, cause the processors to perform the steps of:
       while hashing a first block header of a first candidate block at a first mining node,
          sending, to other mining nodes, a first message specifying transactions and an order of the specified transactions in a first ordered set contained in the first candidate block;
          receiving a second message identifying transactions and an order of the identified transactions in a second ordered set contained in a second candidate block being mined by a second mining node;
          receiving a transaction and second block header information from the second mining node indicating successful completion of a proof-of-work with regard to the second candidate block, wherein the second block header information includes at least a timestamp and a nonce;
          assembling a second block header based on the second ordered set of transactions, the transaction, and the second block header information; and
          validating the second candidate block by hashing the second block header to validate the proof-of-work.

18. The computing device of claim 17, wherein receiving the second message includes storing the second ordered set of transactions in association with a second mining node identifier in memory at the first mining node.

19. The computing device of claim 14, wherein assembling the second block header includes determining a Merkle root from the second ordered set of transactions and the transaction.

20. A non-transitory computer-readable medium storing processor-executable instructions for implementing a first mining node for mining blocks on a blockchain network, the processor-executable instructions including instructions that, when executed by one or more processors, cause the processors to perform the steps of:
   while hashing a first block header of a first candidate block at a first mining node,
      sending, to other mining nodes, a first message specifying transactions and an order of the specified transactions in a first ordered set contained in the first candidate block;
      receiving a second message identifying transactions and an order of the identified transactions in a second ordered set contained in a second candidate block being mined by a second mining node;
      receiving a transaction and second block header information from the second mining node indicating successful completion of a proof-of-work with regard to the second candidate block, wherein the second block header information includes at least a timestamp and a nonce;
      assembling a second block header based on the second ordered set of transactions, the transaction, and the second block header information; and
      validating the second candidate block by hashing the second block header to validate the proof-of-work.

21. The non-transitory computer-readable medium of claim 20, wherein receiving the second message includes storing the second ordered set of transactions in association with a second mining node identifier in memory at the first mining node.

22. A computing device implementing a first mining node for mining blocks on a blockchain network, the computing device including:
   one or more processors;
   memory;
   computer-executable instructions stored in the memory that, when executed by the one or more processors, cause the processors to perform the steps of:
      while hashing a first block header of a first candidate block at a first mining node,
         sending, to other mining nodes, a first message specifying transactions and an order of the specified transactions their order in a first ordered set contained in the first candidate block;
         receiving a second message identifying transactions and an order of the identified transactions their order in a second ordered set contained in a second candidate block being mined by a second mining node; and
         finding a proof-of-work in association with a nonce in the first block header of the first candidate block by hashing the first block header to produce a hash value below a difficulty threshold and, as a result,
            sending the other mining nodes a coinbase transaction from the first candidate block and first block header information, wherein the first block header information includes at least a timestamp and the nonce; and
            adding the first candidate block to a local copy of the blockchain.

23. A non-transitory computer-readable medium storing processor-executable instructions for implementing a first mining node for mining blocks on a blockchain network, the processor-executable instructions including instructions that, when executed by one or more processors, cause the processors to perform the steps of:
   while hashing a first block header of a first candidate block at a first mining node,
      sending, to other mining nodes, a first message specifying transactions and an order of the specified transactions their order in a first ordered set contained in the first candidate block;
      receiving a second message identifying transactions and an order of the identified transactions their order in a second ordered set contained in a second candidate block being mined by a second mining node; and
      finding a proof-of-work in association with a nonce in the first block header of the first candidate block by hashing the first block header to produce a hash value below a difficulty threshold and, as a result,
         sending the other mining nodes a coinbase transaction from the first candidate block and first block header information, wherein the first block header information includes at least a timestamp and the nonce; and
         adding the first candidate block to a local copy of the blockchain.

\* \* \* \* \*